United States Patent
Ramakrishnan et al.

(10) Patent No.: US 7,127,567 B2
(45) Date of Patent: Oct. 24, 2006

(54) PERFORMING MEMORY RAS OPERATIONS OVER A POINT-TO-POINT INTERCONNECT

(75) Inventors: Siva Ramakrishnan, Beaverton, OR (US); Ioannis Schoinas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 10/741,722

(22) Filed: Dec. 18, 2003

(65) Prior Publication Data
US 2005/0138304 A1 Jun. 23, 2005

(51) Int. Cl.
*G06F 13/16* (2006.01)
(52) U.S. Cl. ...................................................... 711/152
(58) Field of Classification Search ................ 711/150, 711/152, 168
See application file for complete search history.

(56) References Cited

U.S. PATENT DOCUMENTS

| | | | | |
|---|---|---|---|---|
| 5,701,437 A | * | 12/1997 | Kinjo et al. | 711/162 |
| 5,742,831 A | * | 4/1998 | Creta | 710/244 |
| 5,832,304 A | * | 11/1998 | Bauman et al. | 710/40 |
| 5,915,264 A | * | 6/1999 | White et al. | 711/168 |
| 6,347,362 B1 | | 2/2002 | Schoinas et al. | |
| 6,662,276 B1 | | 12/2003 | Schoinas | |
| 6,971,098 B1 | | 11/2005 | Khare et al. | |
| 2005/0114601 A1 | | 5/2005 | Ramakrishnan | |
| 2005/0125580 A1 | | 6/2005 | Madukkarumukumana et al. | |
| 2005/0132365 A1 | | 6/2005 | Madukkarumukumana et al. | |
| 2005/0135176 A1 | | 6/2005 | Ramakrishnan et al. | |
| 2005/0188064 A1 | | 8/2005 | Schoinas | |
| 2005/0204193 A1 | | 9/2005 | Mannava et al. | |
| 2005/0273602 A1 | | 12/2005 | Wilson et al. | |
| 2005/0273633 A1 | | 12/2005 | Wilcox et al. | |
| 2005/0273635 A1 | | 12/2005 | Wilcox et al. | |

OTHER PUBLICATIONS

U.S. Appl. No. 10/859,656; Title: Packet Exchange For Controlling System Power Modes; Inventor: Jeffery Wilcox; Filing Date: Jun. 2, 2004.
U.S. Appl. No. 10/956,630; Title: Fault Processing for Direct Memory Access Address Translation; Inventor: Rajesh Madukkarumukumana; Filing Date: Sep. 30, 2004.
U.S. Appl. No. 10/956,206; Title: Caching Support for Direct Memory Access Address Translation; Inventor: Ioannis Schoinas; Filing Date: Sep. 30, 2004.
U.S. Appl. No. 10/956,198; Title: Address Translation for Input/Output Devices Using Hierarchical Translation Tables; Inventor: Ioannis Schoinas; Filing Date: Sep. 30, 2004.
U.S. Appl. No. 10/957,306; Title: Performance Enhancement of Address Translation Using Translation Tables Covering Large Address Spaces; Inventor: Ioannis Schoinas, Filing Date: Sep. 30, 2004.
U.S. Appl. No. 11/011,300; Title: Method, System, and Apparatus for Dynamic Reconfiguration of Resources; Inventor: Mani Ayyar; Filing Date: Dec. 13, 2004.
U.S. Appl. No. 11/011,801; Title: Method, System, and Apparatus for System Level Initialization; Inventor: Mani Ayyar; Filing Date: Dec. 13, 2004.

(Continued)

*Primary Examiner*—Kevin L. Ellis
(74) *Attorney, Agent, or Firm*—Rob D. Anderson

(57) ABSTRACT

In some embodiments, a memory transaction is received that was sent over an unordered interconnect. A determination is made as to whether an address conflict exists between the memory transaction and another memory transaction. If the address conflict exists the memory transaction is forwarded only after waiting until the conflict is resolved. Other embodiments are described and claimed.

19 Claims, 3 Drawing Sheets

OTHER PUBLICATIONS

U.S. Appl. No. 11/026,314; Title: Direct Memory Access (DMA) Address Translation Between Peer Input/Output (I/O) Devices; Inventor: Rajesh Madukkarumukumana; Filing Date: Dec. 29, 2004.

U.S. Appl. No. 11/321,213; Title: Firm Partitioning in a System With a Point-to-Point Interconnect; Inventor: Ioannis Schoinas; Filing Date: Dec. 28, 2005.

U.S. Appl. No. 11/284,520; Title: In Band Configuration Agent For Link Based Computing System; Inventor: Eric Delano; Filing Date: Nov. 21, 2005.

U.S. Appl. No. 11/320,923; Title: Conditional and Vectored System Management Interrupts; Inventor: Mani Ayyar; Filing Date: Dec. 28, 2005.

* cited by examiner

PERFORMING MEMORY RAS OPERATIONS OVER A POINT-TO-POINT INTERCONNECT

RELATED APPLICATION

This application is related to U.S. patent application Ser. No. 10/741,721 entitled "SYNCHRONIZING MEMORY COPY OPERATIONS WITH MEMORY ACCESSES" to inventors Siva Ramakrishnan and Ioannis Schoinas and filed on Dec. 18, 2003.

TECHNICAL FIELD

The inventions generally relate to performing memory operations over a point-to-point interconnect.

BACKGROUND

Memory Reliability Availability and Serviceability (Memory RAS) features can include features such as memory mirroring, memory sparing, memory RAID (Redundant Array of Independent Disks), etc. Memory RAS features are increasingly becoming more important in various computer related market segments such as server market segments, including low end server market segments. Memory RAS features help server application availability by providing mechanisms to recover and/or reconstruct memory data without bringing the system down in cases where erroneous data is supplied by the memory devices. Such memory RAS features need to be enabled in server platforms without severely impacting the performance of the system.

Memory RAS features have been implemented in systems using centralized memory where a centralized memory controller coordinates all access to the memory and centralized decision making occurs. However, it would be advantageous to have memory RAS features provided in distributed memory systems using distributed logic and/or distributed decision making where point-to-point scalable coherent interconnects connect various processing nodes and multiple memory controllers are able to cooperate using message control. However, such a system poses unique challenges that have not previously been addressed.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to performing memory operations over a point-to-point interconnect. Some embodiments relate to performing memory RAS (Reliability Availability and Serviceability) operations over a scalable coherent unordered point-to-point interconnect. In some embodiments memory RAS transactions that have been sent over an unordered interconnect fabric are serialized while efficiently processing the memory RAS transactions with minimal latency.

In some embodiments memory RAS features are provided in distributed memory systems. In some embodiment memory RAS features are implemented in distributed memory systems using distributed logic and/or distributed decision making, where point-to-point scalable coherent interconnects connect various processing nodes and multiple memory controllers are able to cooperate using message control.

In some embodiments a memory engine identifies address conflicts of memory transactions and serializes the conflicts to maintain coherence due to an unordered interconnect, a memory write queue stores at least one memory transaction received by the memory engine, a pending memory write queue stores at least one memory transaction if an address conflict is identified by the memory engine, and a memory interface couples the memory engine to a memory.

In some embodiments a memory transaction is received that was sent over an unordered interconnect, a determination is made whether an address conflict exists between the memory transaction and another memory transaction, and if the address conflict exists waiting until the conflict is resolved before forwarding the memory transaction.

Figure 1:
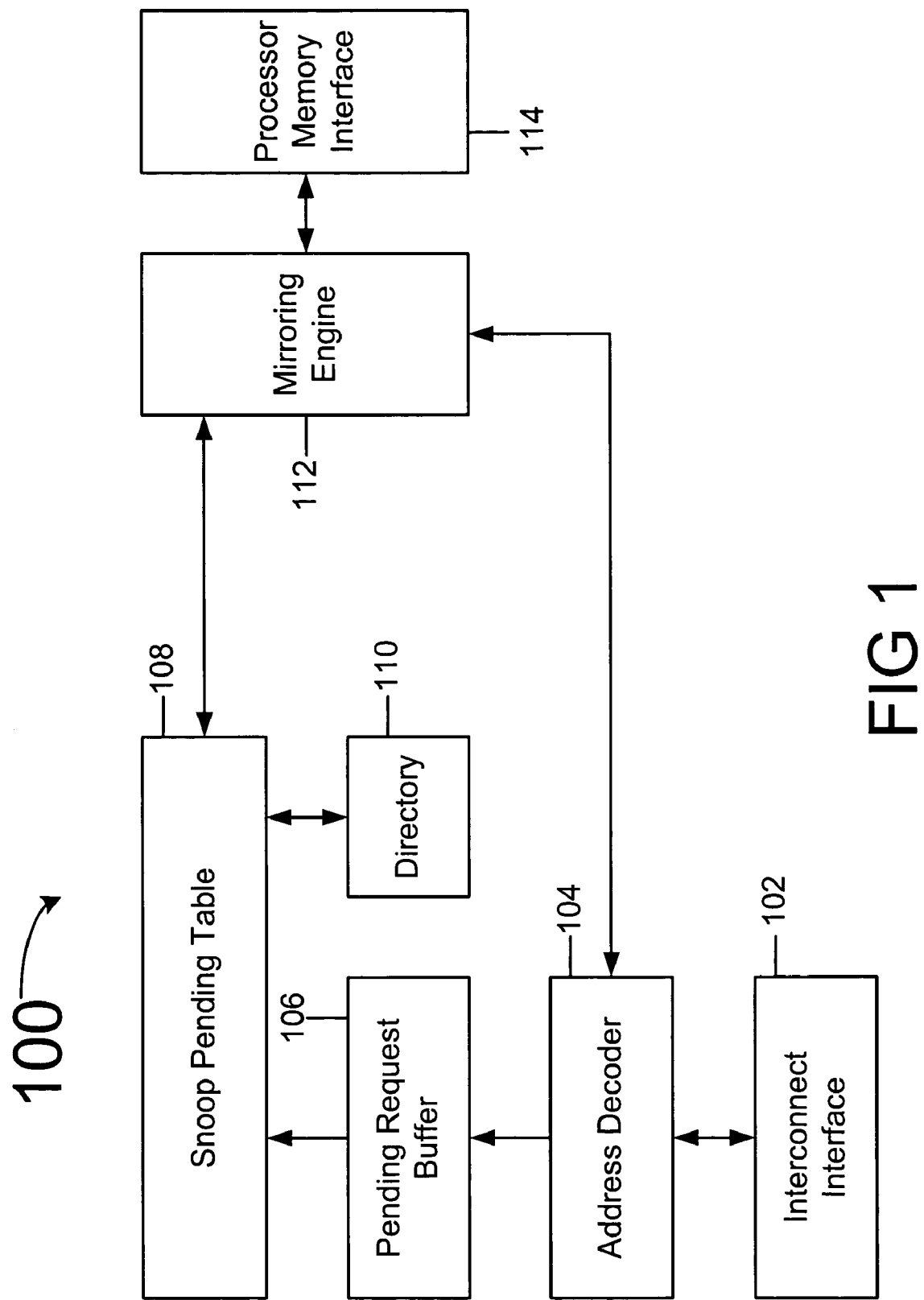
FIG. 1 is a block diagram representation illustrating a memory RAS arrangement according to some embodiments of the inventions.

FIG. 1 illustrates a memory RAS apparatus 100 according to some embodiments. Memory RAS apparatus 100 includes an interconnect interface 102, an address decoder 104, a pending request buffer (PRB) 106, a snoop pending table (SPT) 108, a directory 110, a mirroring engine (and/or a mirror write pending table, MWPT) 112, and a processor memory interface (PMI) 114. In some embodiments interconnect interface 102, address decoder 104, priority request buffer 106, snoop pending table 108 and directory 110 are included within a processor or CPU and mirroring engine 112 and processor memory interface 114 are included in a memory controller. In some embodiments the memory controller is an external memory controller. In some embodiments the memory controller is an integrated memory controller (integrated with the processor). In some embodiments mirroring engine 112 is included within the processor die.

In some embodiments a point-to-point coherent interconnect is used as a system interconnect fabric connecting distributed memory RAS apparatus 100 to other distributed devices (for example, to one or more other processors, memory controllers, memory RAS apparatus, etc.) System components connect to the system interconnect fabric using ports such as the interconnect interface 102.

Interconnect interface 102 may be a port over which transactions such as read/write transactions are used to access memory and/or I/O data. The read/write transactions include the address to which the read/write operation needs to be performed. Address decoder 104 determines the region to which the address belongs and forwards the transactions accordingly. Transactions decoded by the address decoder 104 are buffered into the pending request buffer 106 for processing by a coherence engine such as snoop pending table 108.

Snoop pending table 108 initiates the necessary coherence transactions such as probing all the caches of the system (for example, using a Snoopy protocol), or probing selected caches in the system based on a directory entry for that address in directory 110 using a directory based protocol. The snoop pending table 108 is also responsible for initiating memory accesses through the processor memory interface 114 based on the snoop responses from the various caches throughout the system. After receiving all of the coherence responses from various agents and accurately resolving the coherence for that address, the snoop pending table 108 sends the appropriate response including the necessary data to the source of the transactions. While the coherence for a given address is being resolved at the snoop pending table 108, other incoming transactions with conflicting addresses are held in the pending request buffer 106 until the coherence for the prior transaction is completely resolved.

Memory RAS operations such as mirroring involve keeping two copies of data for every memory address at all times. Memory RAS operations such as memory migration involve copying a portion of the memory data to spare memory or another section of memory when required.

When mirroring is disabled only one copy of the memory data exists in memory. The first (or only) copy is referred to as the "primary copy" or "primary memory", for example. The second copy is referred to as "secondary copy" or "mirrored copy" or "mirrored memory" for example.

Making a copy of memory data involves generating an additional memory write to a different memory address. For this reason, memory write transactions are the transactions that are primarily affected by the memory RAS operations. For example, in mirroring memory read transactions coming into any memory agent are generally processed exactly the same way with or without mirroring, unless the memory read from the primary address results in erroneous data. In such cases an additional memory read to the mirrored location is generated to obtain the correct data. On the other hand, memory write transactions generate an additional memory write transaction to a different memory address (the mirrored address) when mirroring is enabled, and only one memory write transaction is generated to the primary address (that is, the address involved in the transaction) when mirroring is disabled.

In some embodiments the mirroring engine 112 (or mirror write pending table MWPT 112) is a mechanism for transparent mirror operations. It is similar to the snoop pending table 108. In some embodiments the MWPT can be part of the snoop pending table 108. Mirroring engine 112 keeps track of pending mirror transactions from local and/or remote memory agents. The mirroring engine 112 keeps track of all pending mirroring transactions for writes (and reads). All mirror write transactions are queued in a mirror write queue (MWRQ) and tracked until completion. The mirroring engine 112 keeps the order of mirror write transactions in case of address conflicts. Mirroring engine 112 resolves address conflicts among mirror write/read transactions as follows. If there is an address conflict, the conflicting transaction is queued into a pending write mirror queue (PMWRQ). When the conflicting transaction completes, the pending transaction is moved to the MWRQ. In this manner, write ordering to the same address is preserved. Mirroring engine 112 also enables the receipt of mirror transactions and dispatch thereof directly to the memory interface. The memory interface response is directly forwarded to the source.

In some embodiments a copy engine is included within the mirroring engine 112. In some embodiments the mirroring engine 112 is the copy engine. In some embodiments the copy engine is not included in the mirroring engine 112. In some embodiments the copy engine is included in the processor memory interface 114. In some embodiments the copy engine is a hardware device. In some embodiments the copy engine is a software and/or firmware device. The copy engine is used to generate the additional memory writes and/or reads required to track the completion of the transactions required during memory RAS operations (for example, during mirroring operations). The mirroring engine 112 hosts the copy engine, and can include additional hardware to perform memory RAS operations such as sparing, mirroring and/or migration.

In some embodiments the memory associated with a particular copy engine may be hot pluggable. In some embodiments the CPU/chipset component associated with a particular copy engine may be hot pluggable. In such a case after a hot plug, mirroring is re-enabled for the hot plugged unit, and the new mirror must be in sync with the current primary. Therefore, all data from the current primary needs to be copied to the new mirror. The copy may be accomplished by a memory read from the primary followed by a write to the mirror. For example, every primary DIMM (Dual In-Line Memory Module) location is copied to a hot plugged mirror location, which may involve multiple memory regions. The copy process co-exists with memory reads and/or writes to primary memory. The reads and/or writes from other agents interleave at the home node with the reads/writes from the copy process. If the copy process cannot guarantee atomicity (that is, the process completing without any interruptions) inconsistent memory data may result for memory that is not coherent or is not cached. Therefore, a coherence mechanism alone may not be able to resolve all coherency issues, so a copy synchronization scheme is used to guarantee atomicity.

All local memory read/write transactions are forwarded to the mirroring engine 112 by the snoop pending table 108. Memory read transactions are directly forwarded to primary memory by the mirroring engine 112 via the processor memory interface 114. If the data from the primary memory location is error-free it is directly forwarded to the snoop pending table 108. If the data is erroneous a new memory read is generated to the mirrored memory. If the data from the mirrored memory is error-free it is then forwarded to the snoop pending table 108. If the data from the mirrored memory is not error free error handling mechanisms are invoked (for example, ECC, etc.)

Memory write transactions arriving at the mirroring engine 112 are duplicated and queued into a memory write queue (MWRQ) if there are no address conflicts with any other entries within the MWRQ. In some embodiments the MWRQ is included within the mirroring engine 112. If an address conflict is found within the MWRQ the new memory write transaction is buffered in a pending memory write queue (PMWRQ). In some embodiments the PMWRQ is included within the mirroring engine 112.

The memory write queue (MWRQ) is necessary where the interconnect fabric is unordered. The MWRQ may be used to serialize memory read/write transactions with address conflicts in order to preserve coherence. The MWRQ enables the snoop pending table 108 to respond to the source of a write transaction without waiting for a mirrored write completion. The MWRQ also releases any requirement of the snoop pending table 108 to serialize the mirrored transactions.

Figure 2:
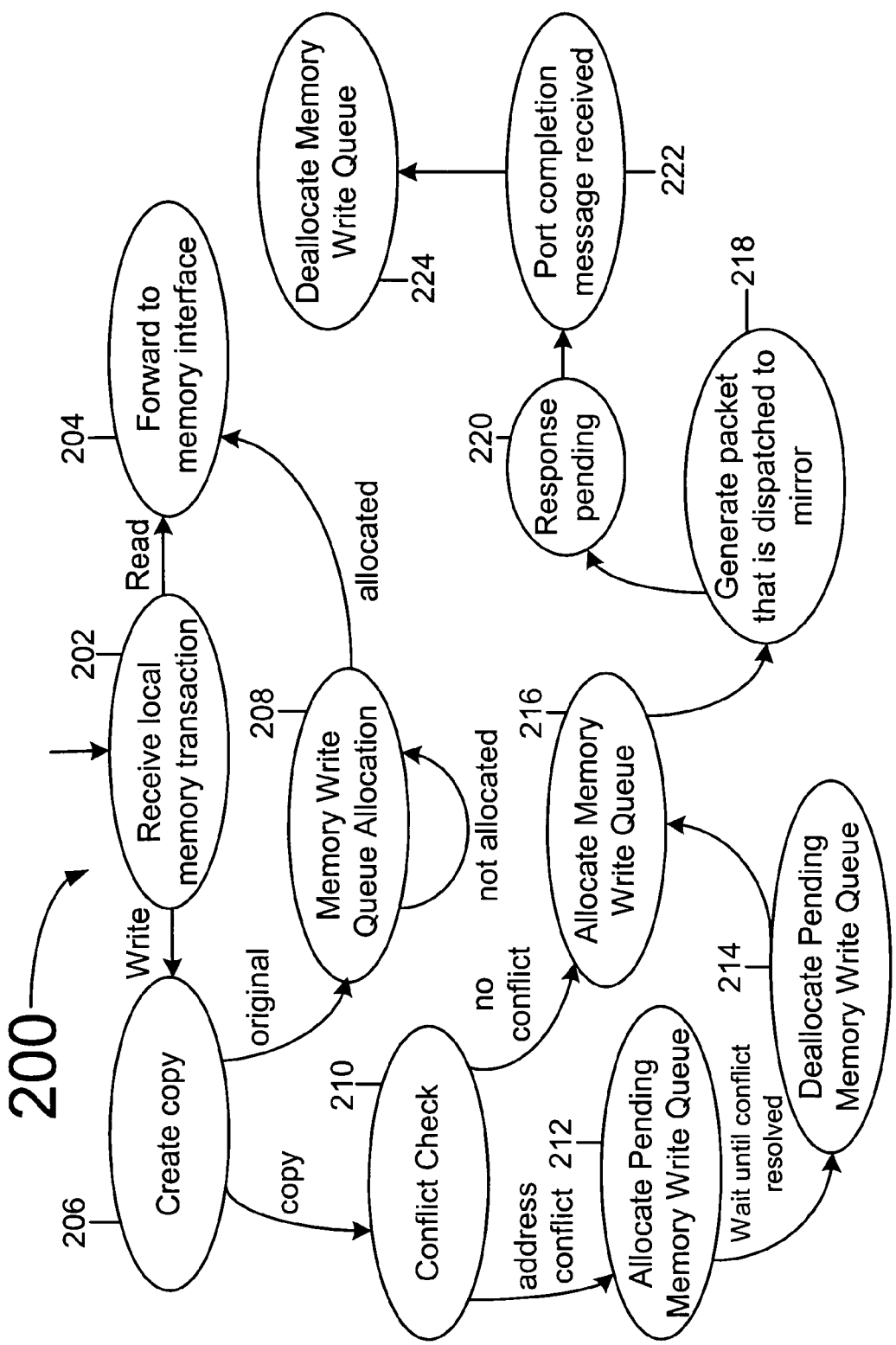
FIG. 2 is a block diagram illustrating a state transition diagram according to some embodiments of the inventions.

FIG. 2 illustrates a state transition diagram 200 implementing a mirroring engine such as mirroring engine 112 of FIG. 1 according to some embodiments. In some embodiments state transition diagram 200 is a transition diagram for implementing local memory transactions. A local memory transaction is received at state 202. If the received transaction is a read transaction it is forwarded to a memory interface at state 204. If the transaction received at state 202 is a write transaction then a copy is created at state 206. The original transaction is sent to state 208 where a determination is made as to whether an allocation has been made in a memory write queue (MWRQ). Once a MWRQ has been allocated the original is sent to state 204 where the transaction is forwarded to the memory interface.

A conflict check is performed at state 210 to determine whether or not the transaction has an address conflict with any of the other entries in the MWRQ. If state 210 determines that there is such an address conflict then a pending write queue (PMWRQ) allocation is made at state 212. Once the conflict identified in state 210 is resolved then the transaction is de-allocated from the PMWRQ at state 214 and is allocated at the MWRQ at state 216. If state 210 determines that there is no address conflict then the MWRQ is allocated at state 216. After the MWRQ is allocated at 216 state 218 generates a packet that is dispatched to the mirror memory location. State 220 waits for a response to the dispatched packet and a port completion message is received at state 222 identifying that the dispatched packet was received at the mirror memory location. The MWRQ is then de-allocated at state 224.

The state transition diagram 200 of FIG. 2 can be used in some embodiments for implementing local memory transactions. In some embodiments other implementations may be used for remote memory transactions (for example, within a mirroring engine such as mirroring engine 112 of FIG. 1 or within a snoop pending table such as snoop pending table 108 of FIG. 1) as follows. A remote memory transaction is first received. The transaction is then forwarded to a memory interface (for example, memory interface 114 of FIG. 1). Then a state is reached in which a pending response from the memory interface is due. Once a response is received from the memory interface it is then forwarded to the source of the transaction.

Figure 3:
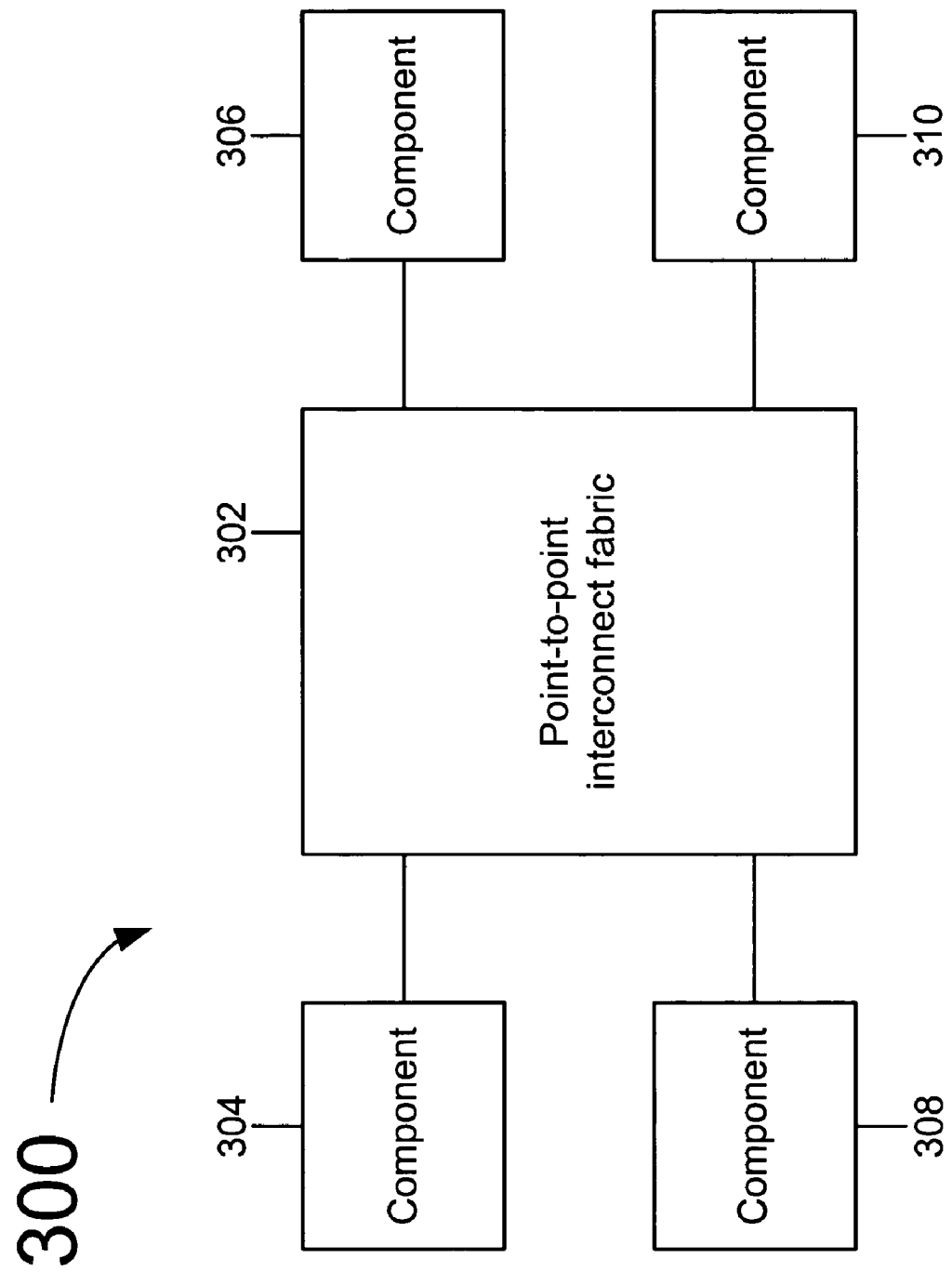
FIG. 3 is a block diagram illustrating a system according to some embodiments of the inventions.

FIG. 3 illustrates a system 300 according to some embodiments. System 300 includes a point-to-point interconnect fabric 302, a component 304, a component 306, a component 308 and a component 310. Although four components 304, 306, 308 and 310 are illustrated in FIG. 3 any number of components may be used in systems according to some embodiments. In some embodiments fabric 302 is a point-to-point coherent interconnect used as a system interconnect fabric. In some embodiments system 300 may be a server system. In some embodiments each of components 304, 306, 308 and 310 may be one or more of the following components: a processor, a memory controller (integrated or external), I/O device, memory, etc.

In some embodiments one or more of the components 304, 306, 308 and 310 include distributed logic and/or distributed decision making used to perform memory RAS operations. For example, each or some of the components of FIG. 3 can include various features, hardware, logic, etc. of the memory RAS operations described in reference to FIG. 1 and FIG. 2 such as mirroring engine 112 of FIG. 1, the state transition operation of FIG. 2, etc.

In some embodiments each of the components 304, 306, 308 and 310 of FIG. 3 includes features of performing memory RAS operations using distributed logic and distributed decision making throughout the components. These memory RAS operations typically involved keeping two copies of the data for every memory address at all times. The distributed logic and distributed decision making of the various components is used to generate additional required memory read/writes and track the completion of those transactions. It also receives local and remote transactions and communicates with each other in the different components via the interconnect fabric, which may be a point-to-point coherent interconnect that is unordered. The distributed logic of the various components is used to serialize address conflicts and preserve coherence.

Although most of the embodiments described above have been described in reference to particular implementations such as memory mirroring or memory migration, other implementations are possible according to some embodiments. For example, the implementations described herein may be used to implement memory RAID over coherent interconnects, memory migration, Operating System transparent migration (with spares) over coherent interconnects, mirroring across hot pluggable units over coherent interconnects (for example, where the memory and/or memory controller are hot pluggable), memory RAID over hot pluggable units, and/or memory sparing, etc. according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state, or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
a memory engine to identify address conflicts of memory transactions in a distributed memory system with a point-to-point interconnect, and to serialize the conflicts to maintain coherence due to an unordered interconnect;
a memory write queue to store at least one memory transaction received by the memory engine;

a pending memory write queue to store at least one memory transaction if an address conflict is identified by the memory engine; and a memory interface to couple the memory engine to a memory.

2. The apparatus according to claim 1, further comprising:

an interface to couple the apparatus to the unordered interconnect; and a snoop pending table coupled to the interface and to the memory engine to initiate coherence transactions.

3. The apparatus according to claim 1, wherein the apparatus is included within a memory controller.

4. The apparatus according to claim 1, wherein the apparatus is included within a processor.

5. The apparatus according to claim 1, wherein the memory engine performs memory RAS operations.

6. A distributed memory system comprising:

an unordered point-to-point interconnect; and at least two components coupled to the interconnect, at least two of the at least two components including:

a memory engine to identify address conflicts of memory transactions in the distributed memory system, and to serialize the conflicts to maintain coherence due to an unordered interconnect;

a memory write queue to store at least one memory transaction received by the memory engine;

a pending memory write queue to store at least one memory transaction if an address conflict is identified by the memory engine; and a memory interface to couple the memory engine to a memory.

7. The system according to claim 6, wherein each of the components includes:

a memory engine to identify address conflicts of memory transactions and serialize the conflicts to maintain coherence due to an unordered interconnect;

a memory write queue to store at least one memory transaction received by the memory engine;

a pending memory write queue to store at least one memory transaction if an address conflict is identified by the memory engine; and a memory interface to couple the memory engine to a memory.

8. The system according to claim 6, at least two of the at least two components further including:

an interface to couple the apparatus to the unordered interconnect; and a snoop pending table coupled to the interface and to the memory engine to initiate coherence transactions.

9. The system according to claim 6, wherein at least one of the components is a memory controller.

10. The system according to claim 6, wherein at least one of the components is a processor.

11. The system according to claim 6, wherein the memory engine performs memory RAS operations.

12. A method comprising:

receiving a memory transaction that was sent over an unordered point-to-point interconnect in a distributed memory system;

determining whether an address conflict exists between the memory transaction and another memory transaction; and if the address conflict exists waiting until the conflict is resolved before forwarding the memory transaction.

13. A method according to claim 12, further comprising:

if the memory transaction is a memory read transaction forwarding it to a memory interface;

if the memory transaction is a memory write transaction then perform the determining.

14. The method according to claim 12, further comprising:

if the address conflict does not exist then forward the memory transaction.

15. The method according to claim 12, wherein the memory transaction is a memory write transaction.

16. The method according to claim 12, further comprising:

if the address conflict exists, storing the memory transaction in a pending memory write queue until the conflict is resolved and then store the memory transaction in a memory write queue after the conflict is resolved; and if the address conflict does not exist, storing the memory transaction in the memory write queue.

17. The method according to claim 12, further comprising:

creating a copy of the memory transaction;

storing the original memory transaction in a memory write queue;

if the address conflict exists storing the copy in a pending memory write queue until the conflict is resolved, and then storing the copy in the memory write queue; and if the address conflict does not exist storing the copy in the memory write queue.

18. An article comprising a computer readable medium having instructions thereon which when executed cause a computer to:

receive a memory transaction that was sent over an unordered point-to-point interconnect in a distributed memory system;

determine whether an address conflict exists between the memory transaction and another memory transaction; and if the address conflict exists wait until the conflict is resolved before forwarding the memory transaction.

19. The article according to claim 18, the computer readable medium further having instructions thereon which when executed cause a computer to:

if the memory transaction is a memory read transaction forward it to a memory interface;

if the memory transaction is a memory write transaction then perform the determining.

* * * * *